INVENTORS.
CARROLL E. WELLER
RONALD L. DIESELBERG

United States Patent Office 3,410,472
Patented Nov. 12, 1968

3,410,472
ELECTRICALLY ISOLATED COPPER
SOLDERING IRON TIP
Carroll E. Weller and Ronald L. Dieselberg, Cincinnati,
Ohio, assignors to Avco Corporation, Cincinnati, Ohio,
a corporation of Delaware
Filed Feb. 6, 1967, Ser. No. 614,293
9 Claims. (Cl. 228—51)

ABSTRACT OF THE DISCLOSURE

The invention embodies an electrically isolated copper soldering iron tip constructed by the insertion of a thermally conductive, electrically non-conductive spacer, such as beryllium oxide, between the heat-producing element and the working surface of the tip, for maintaining the advantages of a standard copper tip yet providing substantially complete electrical isolation to accommodate the soldering of delicate micro-electronic assemblies.

---

This invention relates to the art of soldering and in particular to soldering extremely sensitive micro-electronic assemblies which are subject to being burned out if an electrical current flows through them during the soldering operation. In accordance with the invention a thermally conductive, electrically non-conductive spacer is inserted between the heat producing element and the copper tip to insure that the latter is completely isolated electrically. Conventional soldering irons, whether using conduction or induction heating, are not satisfactory for soldering such assemblies because of possible potential differences which can exist between the copper soldering tip and the unit or assembly being soldered. This potential difference results in current flow through the delicate members being soldered whenever the soldering tip is brought in contact therewith and this electrical current flow therethrough or thereinto, causes burn outs or other injury to such elements.

Attempts have been made to eliminate this condition by making the soldering tip from a material such as beryllium oxide, which is a thermal conductor and an electrical insulator. Although this provides good heating characteristics as well as effective electrical isolation, the beryllium oxide tip is difficult to tin—a necessary procedure in making good soldered connections—and the tips are broken easily since they must be made very small in diameter to accommodate the tiny leads that have to be soldered. Beryllium oxide, in such small diameter, is weak and is subject to cracking and breaking.

In accordance with the invention we insert a thermally conductive, electrically non-conductive spacer of substantial body between the heating element and a standard copper tip, which tip can be made in small diameters to the order of ⅛ of an inch or less. Heat is readily conducted from the heating element through the spacer to the tip and electrical isolation is simultaneously achieved.

Figure 1:
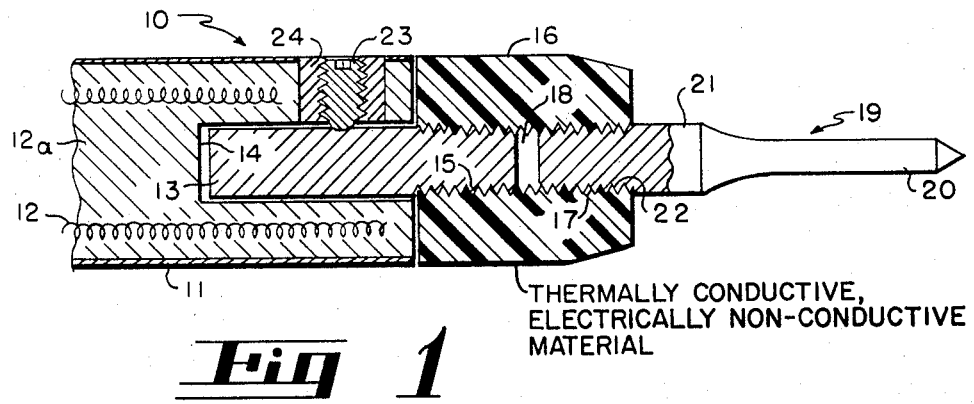
Figure 2:
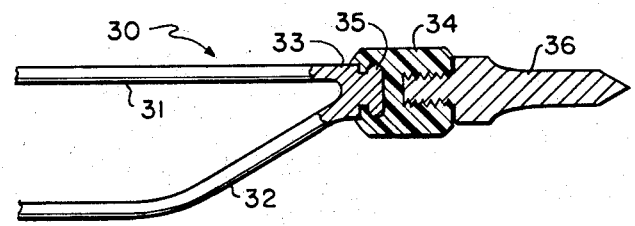
Figure 3:
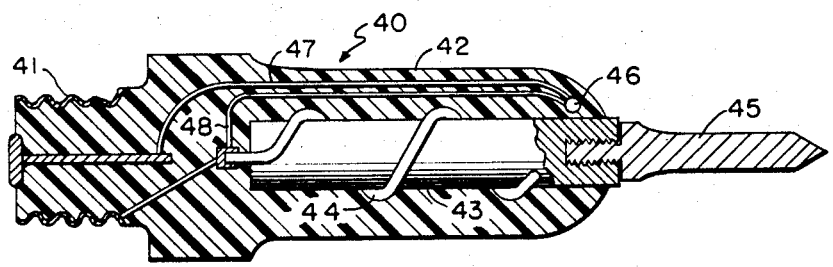

By way of example and not limitation, we have shown in FIGURE 1 of the annexed drawings the working end of a conductive type soldering iron in which the principles of the invention are incorporated; in FIGURE 2 the same is shown in an inductive type iron, the views in both cases being fragmentary side elevation views with parts in section. FIGURE 3 illustrates a modification embodying a candelabra type connection to a source of electricity and a thermostatic control.

In FIGURE 1 the working end 10 of a conductive type iron comprises a conventional barrel 11 within which is included a coiled nichrome wire 12 embedded in compacted heat-conducting refractory material 12a. A copper rod 13 is nested in a longitudinally extending passage 14, the distal end of the rod being threaded at 15. A block 16 of thermally conductive, electrically non-conductive material such as beryllium oxide, is provided with complementary internal threads 17 which extend longitudinally through aligned passage 18. Copper tip 19, the end of which has a small diameter at 20 includes a shank 21 with threads 22 cooperating with threads 17 in number 16. It will be apparent that members 13, 16 and 19 can be assembled in good heat-conducting relationship and can be readily disassembled by the design described. A set screw 23 can be provided in a suitable tapped insert sleeve 24 to permit the assembly 13–16–19 to be removably secured to barrel 11. These parts must of course be tightly screwed in place to provide maximum thermal conductivity.

Although the invention is most effectively utilized for delicate micro-electronic assemblies with a soldering iron in which heat is supplied by conduction, the same can be used in an iron which is inductively heated. In FIGURE 2 the working end 30 of the iron is comprised of relatively stiff copper wires 21 and 32, conveniently formed with a square cross section that are integrally joined at the ends as at 33 to form a conductive body or member which is secured to thermally conductive, electrically nonconductive spacer 34 as by molding it over a button 35 integrally formed with 33. The other ends of the wires in this example are connected to or form a part of the secondary of a conventional step-down transformer, as is well known in the art. A replaceable copper tip 36 is conveniently screwed onto member 34 as clearly illustrated in FIGURE 2.

It should be noted that the spacers 16 and 34 have a cross section at least as great as that of the heat conducting source to which they are connected. These spacers are preferably composed of 99% pure beryllium oxide, are abutted firmly against and secured to the members from which they derive heat.

In FIGURE 3 we have shown a candelabra-type holder 40 having a base 41 which can be connected directly into a source of electrical power through a standard socket. The holder 40 comprises an insulating sheath 42 in which is embedded a beryllium oxide rod 43 around which is wound a nichrome wire or equivalent heating element 44. Threaded onto the end of rod 43 is a copper soldering tip 45 which is replaceable by simply screwing it out and screwing in a new one. A thermo-sensitive switch 46 connected in circuit by conductors 47, 48 is desiredly included in order to permit the heat supplied to tip 45 to be controlled.

It should also be noted that materials other than beryllium oxide, such as boron nitride, can be utilized to the extent they have physical properties of good thermal conductivity combined with good qualities of electrical insulation and adequate strength.

The thickness of the illustrative beryllium oxide block and its physical parameters determines among other things the capacitive coupling between the metal that is being heated and the metal in contact with the work surface. Thus, it is desirable to regard it as an electrical insulator and maintain its length and cross section relatively large in order to preclude buildup of a damaging electrical charge on the iron-tip.

It is pointed out that certain implementation means are easier to achieve than others. For example, it is easy to cast beryllium oxide, but difficult to mill it. Therefore, the preferred embodiment is to cast a large beryllium oxide cylinder with threads cast in along the central axis. A threaded rod is then screwed in on one side and a threaded tip section screwed in on the other side. The shape of the beryllium block might of course have styling as well as functional aspects. Since in FIGURE 1 a relatively large block of beryllium oxide is abutted against the end of soldering iron barrel, heat is conducted from the body of the iron to the beryllium oxide block as well as by way of the copper rod inserted in the barrel of the iron. At the same time the cylindrical shape of the beryllium oxide is not such as to create aesthetic value.

Finally, we wish to point out that it will be advantageous to braze or otherwise deposit a diffused layer of metal or other type conductive material on those surfaces of the beryllium block which will be in contact with the axially opposite metal rod and tip. This is beneficial from the standpoint of improved thermal efficiency since repeated heating of the soldering iron tends to oxidize exposed metal surfaces.

Soldering irons constructed according to the invention conduct heat efficiently, electrically isolate the soldering tip and avoid electrical disturbance or destruction of delicate parts being soldered. The tip is strong and ductile and will not easily break, the tip is easily tinned and the metal shank of the assembly is replaceable with conventional metal shank soldering tips.

Having thus described our invention, we claim:

1. In a soldering iron, in combination, a source of electrically generated heat, a heat-conducting member connected to said source, a copper soldering tip, and a thermally conductive, electrically nonconductive spacer interposed between said member and said tip in heat-conducting relationship therewith.

2. A soldering iron as defined in claim 1 in which the spacer is connected to both said member and said tip in heat-conducting relationship and is removably secured to said member.

3. A soldering iron as defined in claim 1 in which the spacer is connected to both said member and said tip in heat-conducting relationship and is removably secured to both said member and to said tip.

4. The combination of claim 1 in which the cross sectional area of said member and said spacer are large with respect to the cross sectional area of said tip.

5. The combination of claim 1 in which the spacer is composed of beryllium oxide.

6. The combination of claim 1 in which the member has a buttonlike projection integrally formed therewith and the spacer is composed of beryllium oxide molded therearound.

7. The combination of claim 1 in which the heat-conducting member is composed of copper and the spacer is composed of beryllium oxide.

8. In a soldering iron comprising, in combination, an electrically generated source of heat, a copper heat-conducting member connected thereto and extending therefrom, a copper tip disposed in alignment with said member, an electrically nonconductive, thermally conductive spacer interposed between said member and said tip in thermally conductive relationship with each thereof, said spacer being composed of beryllium oxide and having a cross section at least as great as said member, and being removably secured to said member.

9. In a soldering iron comprising, in combination, an electrically generated source of heat, a copper heat-conducting member connected thereto and extending therefrom, a copper tip disposed in alignment with said member, an electrically nonconductive, thermally conductive spacer of substantial mass interposed between said member and said tip in thermally conductive relationship with each thereof, said spacer being composed of beryllium oxide and having a cross section at least as great as said member, and being removably secured to said member.

References Cited

UNITED STATES PATENTS

| | | | |
|---|---|---|---|
| 2,564,427 | 8/1951 | De Rugeris | 228—53 |
| 2,824,201 | 2/1958 | McDaniel | 228—53 |

RICHARD H. EANES, JR., *Primary Examiner.*